United States Patent [19]
Katsumata et al.

[11] Patent Number: 5,543,673
[45] Date of Patent: Aug. 6, 1996

[54] HIGH PERFORMANCE MAGNETIC BEARING

[75] Inventors: Shin Katsumata; Martha Fisher-Votava; David Halsey, all of Rockford, Ill.

[73] Assignee: Sundstrand Corporation, Rockford, Ill.

[21] Appl. No.: 98,117

[22] Filed: Jul. 27, 1993

[51] Int. Cl.[6] .................................................. H02K 7/09
[52] U.S. Cl. .................. 310/90.5; 310/68 B; 324/207.25
[58] Field of Search ................................. 310/90 S, 68 R, 310/68 E, 68 B; 324/207.11, 207.12, 207.25

[56] References Cited

U.S. PATENT DOCUMENTS

| | | | |
|---|---|---|---|
| 4,620,752 | 11/1986 | Fremerey | 310/90 S |
| 4,650,132 | 3/1987 | Graf et al. | 242/18 DD |
| 4,686,404 | 8/1987 | Nakazeki et al. | 310/90 S |
| 4,763,032 | 8/1988 | Bramm et al. | 310/90 S |
| 4,885,491 | 12/1989 | Hiyama et al. | 310/90 S |
| 4,976,177 | 12/1990 | Fouche | 82/147 |
| 5,027,280 | 1/1991 | Ando et al. | 364/474.16 |
| 5,179,308 | 1/1993 | Malsky | 310/90 S |
| 5,216,308 | 6/1993 | Meeks | 310/90 S |

Primary Examiner—Thomas M. Dougherty
Assistant Examiner—D. R. Haszko
Attorney, Agent, or Firm—Wood, Phillips, VanSanten, Hoffman & Ertel

[57] ABSTRACT

A magnetic bearing system (24) supports a shaft (20). The bearing system (24) includes a magnetic rotor (34) and a stator element (36) positioned in proximity to the rotor (34). A plurality of first electromagnets (40, 41, 42) are mounted in the stator element (36). The first electromagnets (40, 41, 42) are of relatively large size to provide high load bearing capacity. A plurality of second electromagnets (44, 45, 46) are mounted in the shator element (36) in spaced relation with the first electromagnets (40, 41, 42), the second electromagnets (44, 45, 46) being of relatively small size to provide high frequency response. Displacement sensors (56, 57, 58) sense position of the shaft (20) relative to the stator element (36). A controller (60) is coupled to the displacement sensors (56, 57, 58) and the electromagnets (40, 41, 42, 44, 45, 46) for controlling current thereto. The controller (60) develops a first set of current signals to the first electromagnets (40, 41, 42) and a second set of current signals to the second electromagnets (44, 45, 46).

21 Claims, 5 Drawing Sheets

HIGH PERFORMANCE MAGNETIC BEARING

FIELD OF THE INVENTION

The present invention relates to bearing systems and, more particularly, to a high performance magnetic bearing system.

BACKGROUND OF THE INVENTION

A rotating member is typically supported relative to a fixed member using some form of bearing. Often, the bearing is a gas or liquid film bearing. However, when run in a vacuum environment, lubricants cannot be used. Unlubricated rolling element bearings tend to be noisy. Magnetic bearings have found use in such applications.

A typical magnetic bearing system for a shaft employs radial bearings and thrust bearings. A radial bearing usually includes four magnets arranged in actuator pairs to respond to loads in a radial axis. A double acting thrust bearing responds to loads in a longitudinal axis. Due to inductance, a large bearing sized for high load capacity becomes too sluggish to respond to high frequency load variations. While smaller bearings could be used instead to provide faster response, such smaller bearings may not be able to handle high loads.

The present invention is directed to solving one or more of the problems discussed above in a novel and simple manner.

SUMMARY OF THE INVENTION

In accordance with the invention there is provided a magnetic bearing system using one bearing designed to carry high loads and another bearing to provide fast response.

Broadly, there is disclosed herein a magnetic bearing system for supporting a shaft. A magnetic material is carried by the shaft. A stator element is positioned in proximity to the magnetic material. A plurality of first electromagnets are mounted in the stator element, the first electromagnets being of relatively large size to provide high load bearing capacity. A plurality of second electromagnets are mounted in the stator element in spaced relation with the first electromagnets, the second electromagnets being of relatively small size to provide high frequency response. Means are provided for sensing position of the shaft relative to the stator element. Control means are operatively coupled to the sensing means and the electromagnets for controlling current to the electromagnets to maintain a desired position of the shaft. The control means develops a first set of current signals to the first electromagnets and a second set of current signals to the second electromagnets.

It is a feature of the invention that the control means includes correction means responsive to the sensed position for developing position correction signals and separation means for separating the correction signals into high and low frequency components, the low frequency components being used to develop the first set of current signals and the high frequency components being used to develop the second set of current signals.

It is another feature of the invention that the control means further comprises transforming means receiving the high and low frequency components of the correction signals for mixing the components of the correction signals in select proportions according to relative position of the electromagnets in the stator element.

There is disclosed in accordance with another aspect of the invention a magnetic radial bearing system for supporting a shaft. The system includes a magnetic material carried by the shaft. A stator element is positioned surrounding the magnetic material. A plurality of first electromagnets are mounted in the stator element circumferentially spaced around the magnetic material, the first electromagnets being of relatively large size to provide high load bearing capacity. A plurality of second electromagnets are mounted in the stator element circumferentially spaced around the magnetic material, the second electromagnets being of relatively small size to provide high frequency response. Means are provided for sensing radial position of the shaft relative to the stator element. Control means are operatively coupled to the sensing means and the electromagnets for controlling current to the electromagnets to maintain a desired position of the shaft. The control means develops a first set of current signals to the first electromagnets and a second set of current signals to the second electromagnets.

It is a feature of the invention to include three of the first electromagnets and three of the second electromagnets.

It is another feature of the invention to include two of the first electromagnets and four of the second electromagnets.

It is still another feature of the invention that each of the first electromagnets is positioned between two of the second electromagnets.

It is a further feature of the invention that each electromagnet comprises a core having a coil wound thereon and the core of each first electromagnet is larger than the core of each second electromagnet.

It is another feature of the invention that each electromagnet comprises a core having a coil wound thereon and the coil of each first electromagnet is larger than the coil of each second electromagnet.

There is disclosed in accordance with another aspect of the invention a magnetic thrust bearing system for supporting a shaft including a magnetic material carried by the shaft. A stator element is positioned surrounding the magnetic material. A pair of first electromagnets are mounted in the stator element on opposition sides of the magnetic material, the first electromagnets being of relatively large size to provide high load bearing capacity. A pair of second electromagnets are mounted in the stator element on opposite sides of the magnetic material, the second electromagnets being of relatively small size to provide high frequency response. Means are provided for sensing longitudinal position of the shaft relative to the stator element. Control means are operatively coupled to the sensing means and the electromagnets for controlling current to the electromagnets to maintain a desired position of the shaft. The control means develop a first set of current signals to the first electromagnets and a second set of current signals to the second electromagnets.

More particularly, there is disclosed that either radial bearings or thrust bearings can be configured to use separate actuators for static loads with large time constants and high frequency loads with low time constants. The two sets of actuators are located generally in a common plane along the axis of rotation.

Shaft position is sensed by a plurality of displacement sensors connected to a controller. The controller develops output current to control each of the bearings. The controller utilizes a proportional-integral-derivative (PID) control to control correction signals which are fed into a crossover circuit or a logic switch to separate displacement signals into high and low frequency components. These components are used to control power amplifiers to supply generally low frequency signals to the large actuators and higher frequency signals to the smaller actuators.

Further feature and advantages of the invention will be readily apparent from the specification and from the drawing.

DETAILED DESCRIPTION OF THE INVENTION

Figure 1:
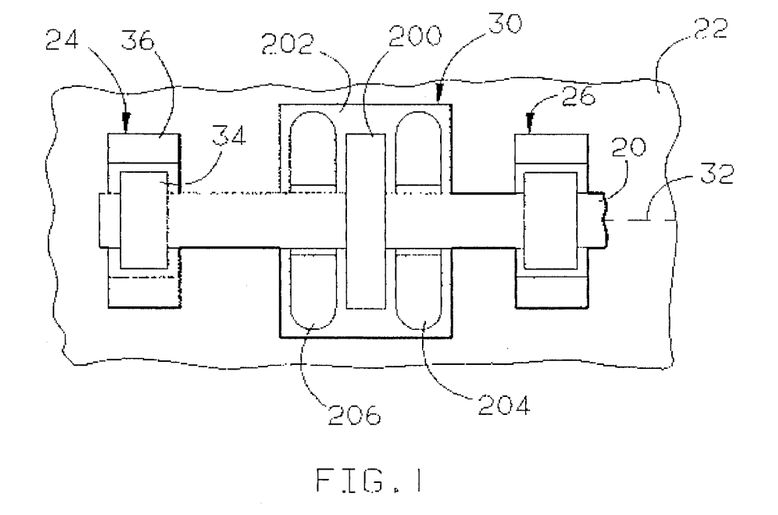
FIG. 1 is a partial perspective view of a system employing a plurality of bearings systems according to the invention for supporting a shaft.

Referring to FIG. 1, a plurality of bearing systems are employed for supporting a shaft 20 within a housing 22. The shaft 20 is supported for rotation about an axis represented by a line 32 using a first radial bearing system 24 at one end, a second radial bearing system 26 at an opposite end and a double acting thrust bearing system 30 therebetween. The radial bearing systems 24 and 26 respond to loads radially of the axis 32. The thrust bearing system 30 responds to loads longitudinal of the axis 32 axis. In accordance with the invention, both the radial bearing systems 24 and 26 and the thrust bearing system 30 are configured to use separate actuators for static loads with large time constants and high frequency loads with low time constants. The two sets of actuators are located generally in a common plane along the axis 32 of rotation of the shaft 20.

The shaft 20 is driven by a motive source, not shown, which does not form a part of the invention. The invention relates particularly to the support of the shaft 20 at a desired position in the housing 22.

Each of the radial bearing systems 24 and 26 are identical in construction. Therefore, only the first radial beating system 24 is described in detail.

The radial bearing system 24 includes a rotor 34 of magnetic material carried by the shaft 20. A stator element 36 is fixed in the housing 22 and surrounds the magnetic rotor 34.

Figure 2:
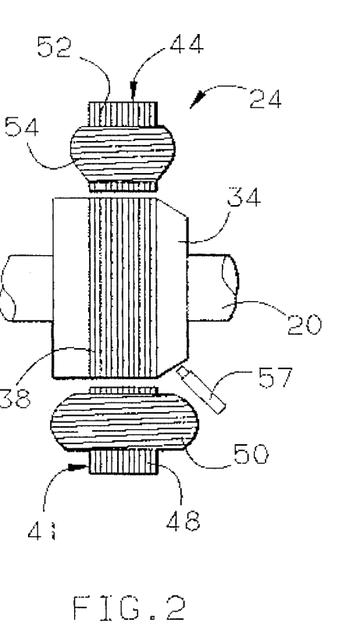
FIG. 2 is a side elevation view of a radial bearing according to a first embodiment of the invention.
Figure 3:
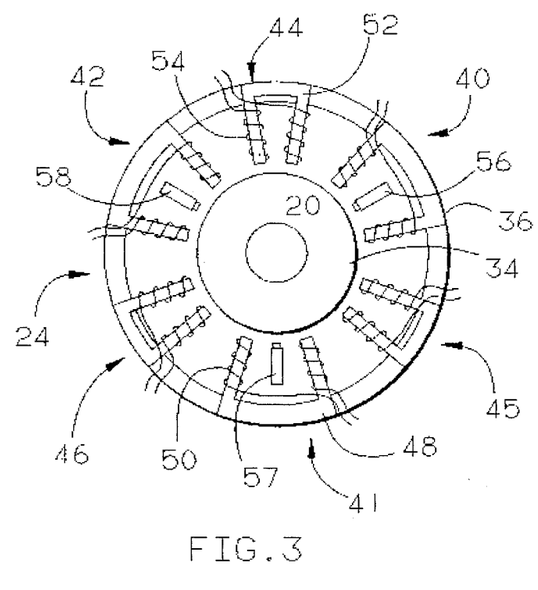
FIG. 3 is an end view of the bearing of FIG. 2.

With particular reference to FIGS. 2 and 3, the radial bearing system 24 is illustrated in greater detail. The shaft 20 is typically of a non-magnetic material. The rotor 34 includes laminations 38 of a magnetic material. Mounted in the stator element 36 are three first electromagnets 40, 41 and 42 and three second electromagnets 44, 45 and 46. The first electromagnets 40–42 are mounted in an alternating configuration with the second electromagnets 44–46. Particularly, each of the first electromagnets 40–42 is circumferentially spaced 120° apart around the stator element 36, and thus the rotor 34. Each of the second electromagnets 44–46 is centrally positioned between two of the first electromagnets 40–42 and are also circumferentially spaced 120° apart relative to one another about the stator element 36 and thus the rotor 34.

Each of the first electromagnets 40–42 are identical in construction. Each of the second electromagnets 44–46 are identical in construction. Only one of each is described in detail herein.

The first electromagnet 41 at the "six o'clock" position includes a U-shaped laminated magnetic core 48 having a coil 50 wound thereon. Similarly, the second electromagnet 44 at the "twelve o'clock" position includes a U-shaped laminated magnetic core 52 having a coil 54 wound thereon. In accordance with the invention, the first electromagnet core 48 has a larger cross-sectional core area than the second electromagnet core 52. Similarly, the first electromagnet coil 50 is larger than the second electromagnet coil 54. The first electromagnets 40–42 carry the majority of the required bearing load. To prevent overheating, the coil 50 of each must be of a relatively large size to provide sustained high current. Due to large cross-sectional core area and large coils, the inductances of the first electromagnets 40–42 are high. The second electromagnets 44–46, having smaller cross-sectional core areas and smaller coils, provide improved frequency response.

While the invention is described with the second electromagnets 44–46 including both smaller cores 52 and smaller coils 54 than for the first electromagnets 40–42, only one of the two need be smaller to provide the desired operation. The particular size of any core or coil is dependent upon the particular application, as is apparent.

To sense radial displacement of the rotor 34, and thus shaft 20, relative to the stator element 36, and thus housing 22, first, second and third displacement sensors 56, 57 and 58, respectively, are used. The sensors 56–58 are fixedly positioned and circumferentially spaced 120° apart in the stator element 36. The sensors 56–58 may be of any conventional type of displacement sensor used with bearing systems.

Figure 10:
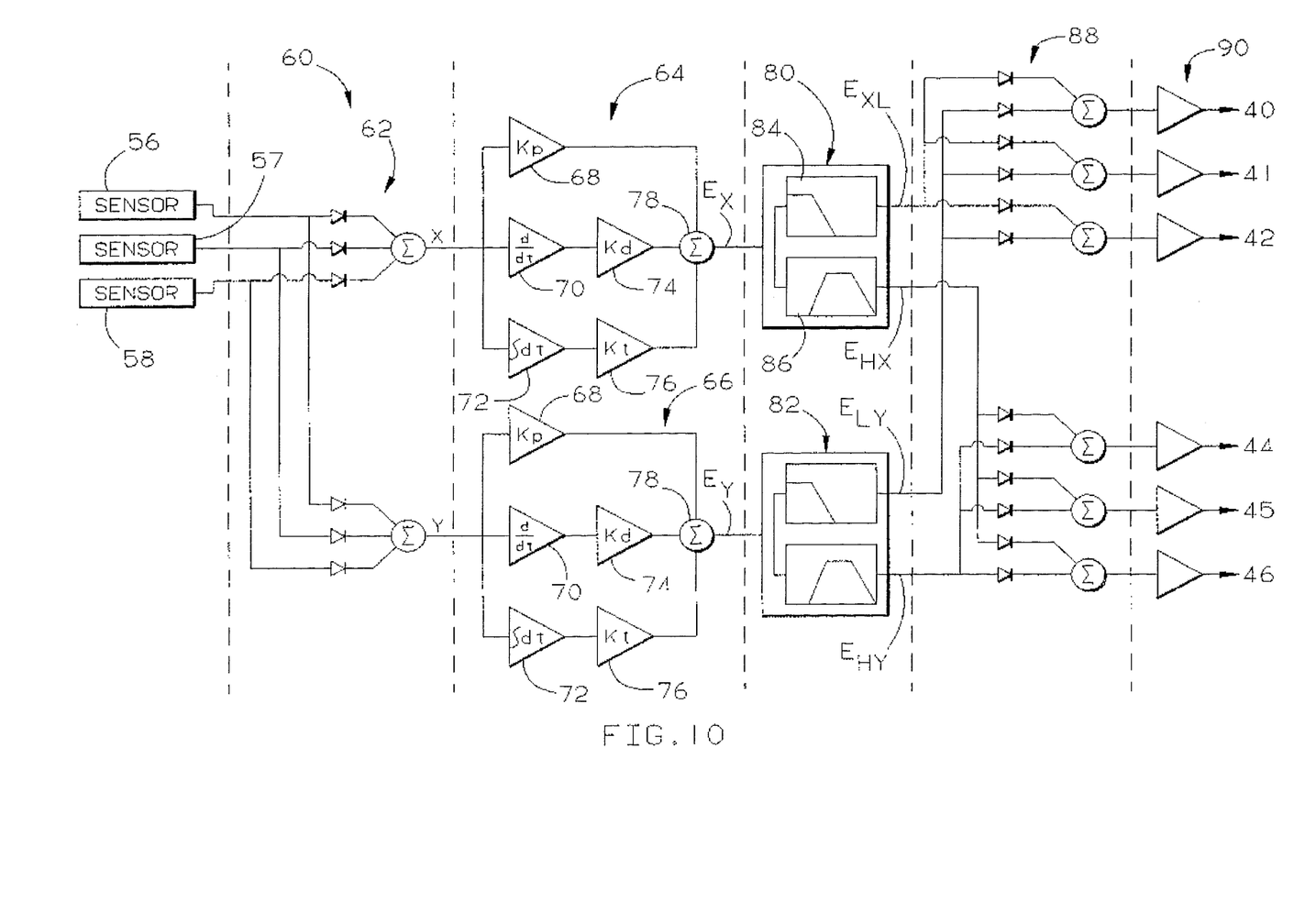
FIG. 10 is a block diagram of a controller for the bearing system of FIGS. 2 and 3.

With reference to FIG. 10, a block diagram illustration is provided for a controller 60 for controlling energization of the coil 50 of each first electromagnet 40–42 and the coil 54 of each second electromagnet 44–46.

Signals from each of the displacement sensors 56–58 are used as inputs to the controller 60. Although not shown, the displacement signals 56–58 are compared to reference values representing desired shaft position to develop positional error signals $d_x$, one for each sensor. The error signals are input to a transformation circuit 62, which transforms the displacement data into rotor displacement error signals in an orthogonal coordinate system using the following equations:

$$X = \frac{d_{57} - 2(d_{56} + d_{58})}{3}$$

$$Y = \frac{d_{58} - d_{56}}{\sqrt{3}}$$

An alternative set of equations could be used if desired.

The orthogonal displacement error signals X and Y are then input into respective Proportional-Integral-Derivative controller circuits 64 and 66. Each PID controller circuit 64 and 66 includes a proportional amplifier 68, a differentiator 70 and an integrator 72. The signal from each differentiator 70 is fed to a derivative gain amplifier 74. The signal from each integrator 72 is fed to an integrator amplifier 76. The signals from each of the three amplifiers 68, 74 and 76 are summed at a summer 78. The output of the summer 78 of each controller circuit 64 and 66 is a corrected error signal $E_x$ and $E_y$, respectively.

The corrected error signals $E_x$ and $E_y$ are fed to first and second crossover circuits 80 and 82. Each of the crossover circuits 80 and 82 are identical. The first crossover circuit 80 includes a low pass amplifier 84 and a high band pass amplifier 86 for respectively separating the correction signal $E_x$ into low frequency components and high frequency components. The crossover circuit 80 develops two component signals, $E_{Lx}$ and $E_{Hx}$, representing the low and high frequency components of the corrected error displacement signal on the X axis. Similarly, the second crossover circuit 82 develops low and high frequency component signals $E_{Ly}$ and $E_{Hy}$ representing the low and high frequency components of the corrected error signals in the Y axis. These signals are all fed to a transformation circuit 88 which transforms the correction signals in appropriate proportions to obtain a first set of current drive signals for each of the first electromagnets 40–42 and a second set of current drive signals for the second electromagnets 44–46. The first set of currents are calculated using the low frequency component values from the crossover circuits 80 and 82. The second set of currents are calculated using the high frequency component values from the crossover circuits 80 and 82. The ratios between the transformed signals may be calculated using the following set of equations, or some similar set of equations:

$$I_{44} = +e_{Hx}$$

$$I_{40} = +\frac{1}{2} e_{Lx} + \frac{\sqrt{3}}{2} e_{Ly}$$

$$I_{45} = -\frac{1}{2} e_{Hx} + \frac{\sqrt{3}}{2} e_{Hy}$$

$$I_{41} = -e_{Lx}$$

$$I_{46} = -\frac{1}{2} e_{Hx} - \frac{\sqrt{3}}{2} e_{Hy}$$

$$I_{42} = +\frac{1}{2} e_{Lx} - \frac{\sqrt{3}}{2} e_{Ly}$$

The outputs from the transformation circuit 88 are fed through respective power amplifiers in an amplifier circuit 90 to develop the current output signals for driving the coils of each of the indicated electromagnets 40–42 and 44–46. The current flowing through the coils magnetize the electromagnets. The strength of the magnetic fields, the flux density, is proportional to the current flowing through the coil. The magnetic force pulling the rotor 34 toward the electromagnets 40–42 and 44–46 is proportional to the square of the flux density between the magnet core faces and the rotor 34. The current flow change in the coils changes the flux density in the electromagnets 40–42 and 44–46, which changes the magnetic force to cause the rotor 34 to move. Separating the correction signals into lower and high frequency components for driving the first electromagnets 40–42 and the second electromagnets 44–46, respectively, provides loading being shared between high load bearings and fast response bearings.

The invention is described using two frequency ranges—one high and one low. The concepts of the invention could be extended to include any number of different frequency ranges, such as three or four, as will be apparent to one skilled in the art.

Figure 4:
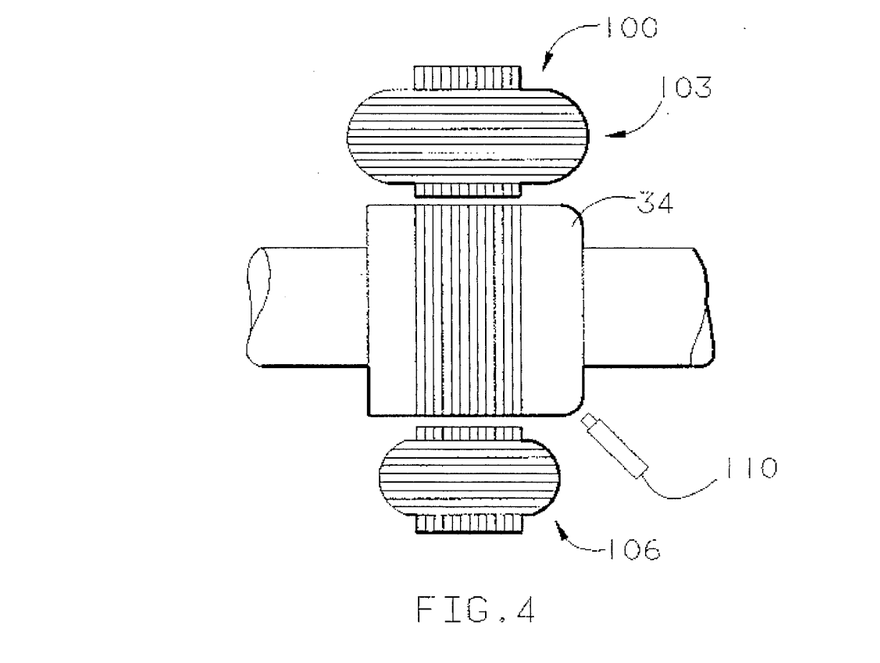
FIGS. 4 is a side elevation view of a radial bearing according to a second embodiment of the invention.
Figure 5:
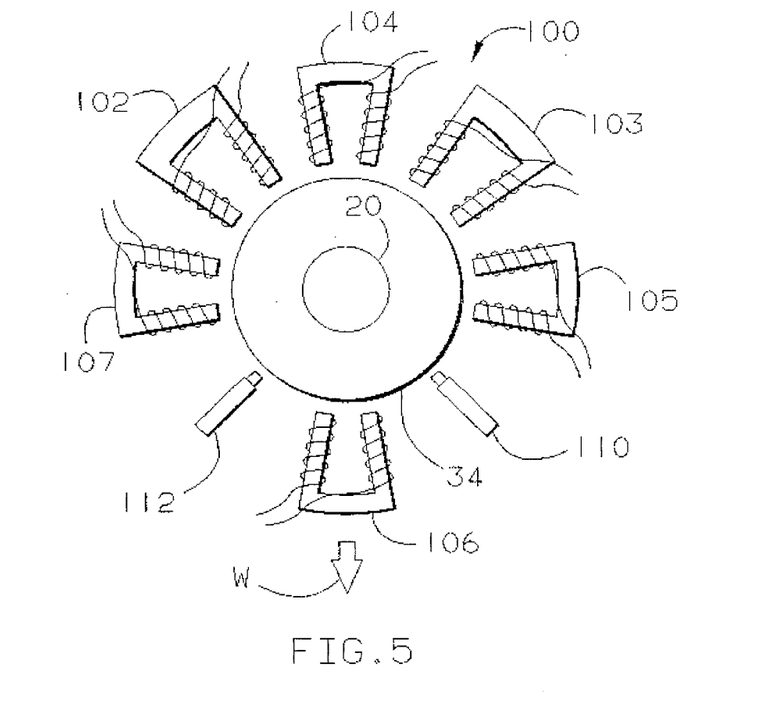
FIG. 5 is an end view of the bearing of FIG. 4.

With reference to FIGS. 4 and 5, a radial bearing system 100 according to a second embodiment of the invention is illustrated. The radial bearing system 100 includes two first electromagnets 102 and 103 also mounted in a stator element (not shown), as with the embodiments of FIGS. 2 and 3, and circumferentially spaced approximately 90° apart and generally above the rotor 34. Four second electromagnets 104, 105, 106 and 107 are also provided. The second electromagnets 104–107 are circumferentially spaced 90° apart. The first electromagnet 102 is positioned between the second electromagnets 104 and 107, while the first electromagnet 103 is positioned between the second electromagnets 104 and 105, as illustrated. Each of the electromagnets 102–107 uses a pulling force to act on a magnetic rotor 108 mounted to the shaft 20. Only two of the first electromagnets 102 and 103 are used, as the system relies on a directional load from gravitational forces, represented by the arrow W, which allows the bearing system 100 to operate without two opposing first electromagnets.

The first electromagnets 102 and 103 are generally similar to the first electromagnets 40–42 discussed above relative to the FIGS. 2 and 3. Similarly, the second electromagnets 104–107 are similar to the second electromagnets 44–46 discussed above relative to FIGS. 2 and 3.

To control the radial bearing system 100, a controller similar to the controller 60 of FIG. 10 is used. Only two displacement sensors 110 and 112 are shown, requiring the use of a modified input transformation circuit 62, as is apparent. Also, the output transformation circuit 88 must be modified, recognizing that only two first electromagnets 102 and 103 are used, while four second electromagnets 103–107 are used and occupy positions spaced 90° apart. Alternatively, the first electromagnets 102 and 103 could be controlled with an on/off circuit to provide a constant pull load to compensate for weight of the rotor. Still further, permanent magnets could be used to provide a constant pull load. The high frequency electromagnets 103–107 could then be controlled to provide a trimming function. In such a control, the current control signals to the windings 104–107 would be represented in accordance with the following table:

| Electromagnets | Current Control |
| --- | --- |
| 104 | $E_{Hy}$ |
| 105 | $E_{Hx}$ |
| 106 | $-E_{Hy}$ |
| 107 | $-E_{Hx}$ |

The radial bearing assembly 100 overall operates generally similar to the radial bearing assembly 24 discussed above.

Figure 6:
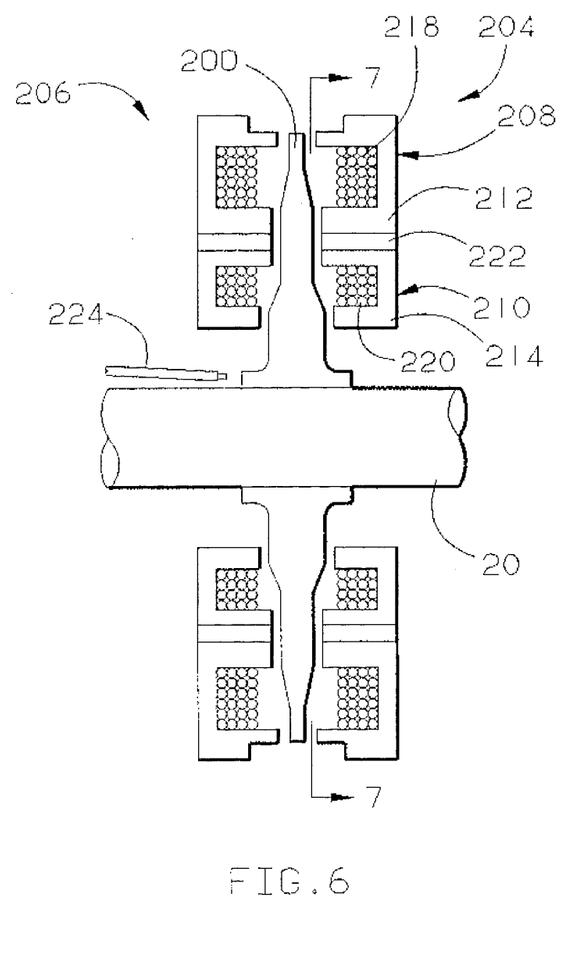
FIG. 6 is a side, sectional view of a thrust bearing according to a first embodiment of the invention.
Figure 7:
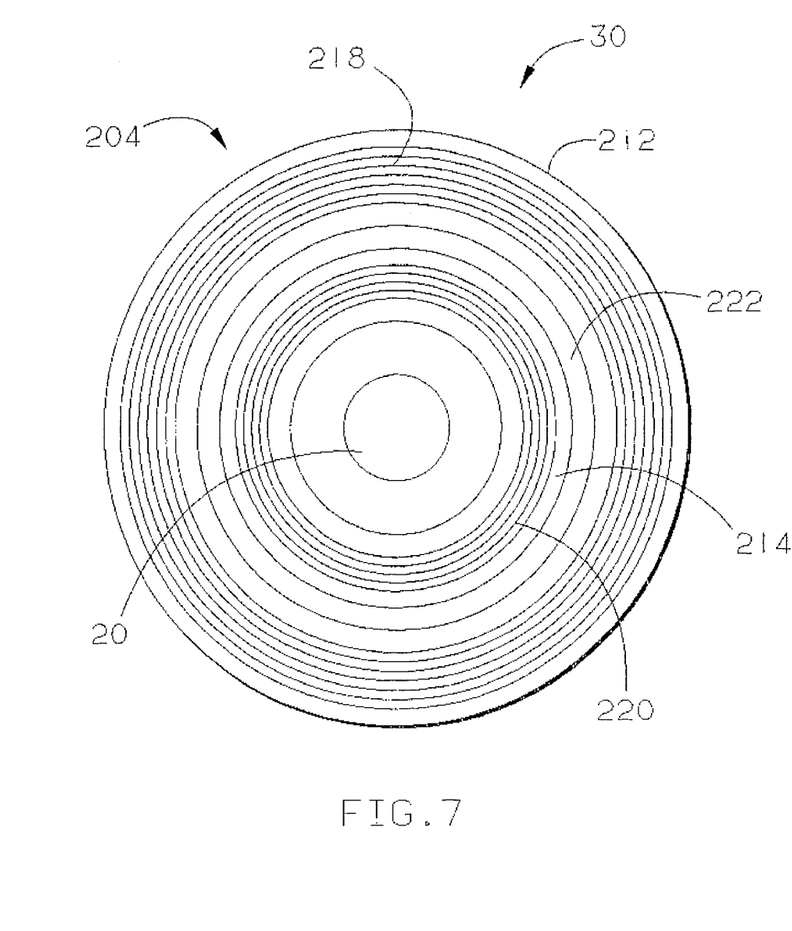
FIGS. 7 is a view taken along the line 7—7 of FIG. 6.

With reference to FIGS. 1, 6 and 7, the thrust bearing assembly 30 will be described. The thrust bearing assembly 30 includes a rotor 200 of magnetic material mounted to the shaft 20 for rotation therewith. A stator housing or element 202 is positioned surrounding the magnetic rotor 200. The stator element 202 supports a set of bearing assemblies 204 and 206 on opposite sides of the rotor 200.

Referring specifically to FIGS. 6 and 7, the first bearing assembly 204 includes a first electromagnet 208 and a second electromagnet 210. The first electromagnet 208 includes a core 212 having a larger cross-sectional area than a core 214 of the second electromagnet 210. A coil 218 is wound in the first electromagnet core 212. A coil 220 is wound in the second electromagnet core 214. The coil 218 is larger than the coil 220. The cores 212 and 214 are each made of a magnetic material and are separated by a cylindrical element 222 of non-magnetic material.

The second electromagnet assembly 206 is similar to the first electromagnet assembly 204, albeit mounted as a mirror image.

As with the radial bearing systems of FIGS. 2–4, the first electromagnet 208 of each assembly 204 and 206 provides high load capacity. The second electromagnet 210 of each assembly 204 and 206, having a smaller cross-sectional area and a smaller coil, has a higher frequency response. The bearing system 30 can be controlled by a controller, such as the controller 60 of FIG. 10. However, in such an application, only a single axis of control is used responsive to a single displacement sensor 224 sensing longitudinal position displacement of the rotor 200. Therefor, the bottom half of the controller 60 for the Y axis can be eliminated. Also, the transformation circuit 88 is eliminated so that the output from the crossover circuit low pass amplifier controls the first electromagnet 208 and the output from the crossover circuit high pass amplifier 86 controls the second electromagnet 210, with the respective coils of the assemblies 204 and 206 being controlled oppositely, as is apparent.

Figure 8:
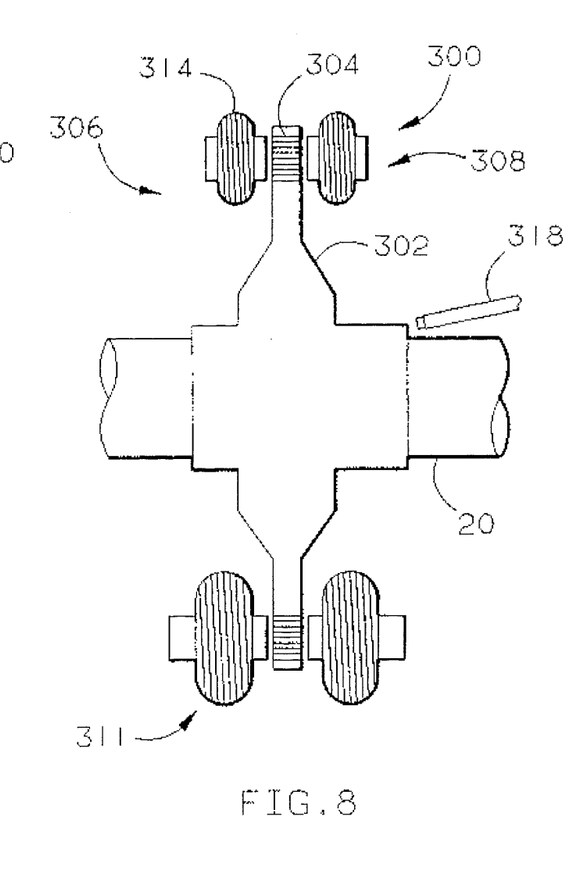
FIG. 8 is a side elevation view of a thrust bearing according to a second embodiment of the invention.
Figure 9:
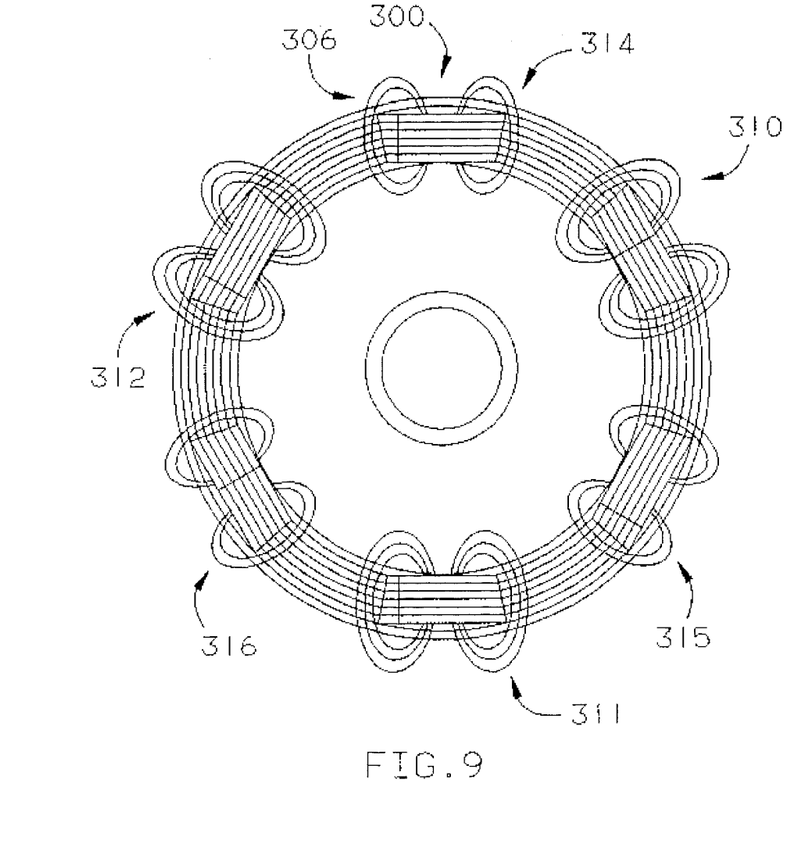
FIG. 9 is an end view of the bearing of FIG. 8.

Referring to FIGS. 8 and 9, a thrust bearing assembly 300 according to a second embodiment of the invention is illustrated. A rotor 302 is mounted to the shaft 20. The rotor 302 is generally of a non-magnetic material and includes a cylindrical laminate 304 of magnetic material about its periphery. First and second electromagnetic assemblies 306 and 308 are mounted on opposite sides of the rotor 302, as with the embodiment of FIGS. 6 and 7. The first electromagnet assembly 306 comprises three first electromagnets 310, 311 and 312 spaced 120° apart. Alternating with the first electromagnets are three second electromagnets 314, 315 and 316, also circumferentially spaced 120° apart. Each of the electromagnets 310–312 and 314–316 are mounted to a stator element, such as the stator element 202 of FIG. 1. The first electromagnets 310–312 have a U-shaped core and coil wound thereon, as with the first electromagnets 40–42 of the radial bearing assembly 24 of FIGS. 2 and 3. The second electromagnets 314–316 have a U-shaped core and coil wound thereon, as with the second electromagnets 44–46 of the radial beating assembly 24 of FIGS. 2 and 3. The core of the first electromagnets 310–312 has a larger cross-sectional area than the core of the second electromagnets 314–316. Similarly, each of the first electromagnets 310–312 has a larger coil than the second electromagnets 314–316.

Although not shown, the second electromagnet assembly 308 is similar to the first electromagnet assembly 306, albeit a mirror image thereof. Each electromagnet assembly 306 and 308 can be controlled with a controller similar to that discussed above relative to the embodiment of FIGS. 6 and 7, using a displacement sensor 318 and with each of the first electromagnets 310–312 being energized simultaneously and at the same level for low frequency control, and the second electromagnets 314–316 being controlled simultaneously and at the same level for high frequency control.

Alternatively, the thrust bearing system 300 could control the electromagnets independently to provide a gyroscopic control.

Thus, in accordance with the invention, a magnetic bearing system is provided in which at least two electromagnets are used, one being controlled in response to low frequency load changes and the other being controlled in response to high frequency load changes, to provide improved support.

We claim:

1. A magnetic bearing system for supporting a shaft, comprising:

a magnetic material carried by the shaft;

a stator element positioned proximately to said magnetic material;

sensing means for sensing a sensed position of said shaft relative to said stator element; and control means operatively coupled between said sensing means and said stator for providing a set of first and second current signals to said stator for supporting said shaft, and for maintaining a desired position of said shaft relative to said stator, with said first current signals being of relatively lower frequency than said second current signals;

said stator element including:

a plurality of first electromagnets for providing primary load bearing support and positioning of said shaft relative to said stator in response to said first current signals; and a plurality of second electromagnets for providing high frequency response positioning of said shaft relative to said stator in response to said second current signals.

2. The magnetic bearing system of claim 1 wherein said control means includes correction means responsive to said sensed position for developing position correction signals and separation means for separating said correction signals into high and low frequency components, the low frequency components being used to develop the first set of current signals and the high frequency components being used to develop the second set of current signals, said first current signals being operatively coupled by said control means to said first electromagnets, and said second set of current signals being operatively coupled by said control means to said second electromagnets.

3. The magnetic bearing system of claim 2 wherein said control means further comprises transforming means receiving said high and low frequency components of said correction signals for mixing the components of the correction signals in select proportions according to said sensed and desired positions of said shaft relative to said stator.

4. A magnetic radial bearing system for supporting a shaft about an axis, the magnetic radial bearing system comprising:

a magnetic material carried by the shaft;

a stator element positioned proximately to and surrounding said magnetic material for supporting said shaft radially about said axis;

sensing means for sensing a sensed radial position of said shaft relative to said stator element; and control means operatively coupled between said sensing means and said stator for providing a set of first and second current signals to said stator for supporting said shaft, and for maintaining a desired radial position of said shaft relative to said stator, with said first current signals being of relatively lower frequency than said second current signals;

said stator element including;

a plurality of first electromagnets for providing primary load bearing support and positioning of said shaft relative to said stator in response to said first current signals; and a plurality of second electromagnets for providing high frequency response positioning of said shaft relative to said stator in response to said second current signals.

5. The magnetic radical bearing system of claim 4 including three of said first electromagnets and three of said second electromagnets.

6. The magnetic radial bearing system of claim 4 including two of said first electromagnets and four of said second electromagnets.

7. The magnetic radial bearing system of claim 4 wherein each of said first electromagnets is positioned between two of said second electromagnets.

8. The magnetic radial bearing system of claim 4 wherein said control means includes correction means responsive to said sensed position for developing position correction signals and separation means for separating said correction signals into high and low frequency components, the low frequency components being used to develop the first set of current signals and the high frequency components being used to develop the second set of current signals.

9. The magnetic radial bearing system of claim 8 wherein said control means further comprises transforming means receiving said high and low frequency components of said correction signals for mixing the components of the correction signals in select proportions according to said sensed and desired radial positions of said shaft relative to said stator.

10. The magnetic radial bearing system of claim 4 wherein each said electromagnet comprises a core having a coil wound thereon, and the core of each said first electromagnet is larger than the core of each said second electromagnet.

11. The magnetic bearing system of claim 1 wherein said first current signals are operatively coupled by said control means to said first electromagnets but not to said second electromagnets, and wherein said second set of current signals are operatively coupled by said control means to said second electromagnets but not to said first electromagnets.

12. A magnetic thrust bearing system for supporting a shaft along an axis, the magnetic thrust bearing system comprising:

a magnetic material carried by the shaft;

a stator element positioned proximately to and said magnetic material and acting thereon in opposing axial directions for supporting said shaft axially against thrust loads acting generally along said axis;

sensing means for sensing a sensed axial position of said shaft relative to said stator element; and control means operatively coupled between said sensing means and said stator for providing a set of first and second current signals to said stator for supporting said shaft, and for maintaining a desired axial position of said shaft relative to said stator, with said first current signals being of relatively lower frequency than said second current signals;

said stator element including:

a plurality of first electromagnets for providing primary load bearing support and positioning of said shaft relative to said stator in response to said first current signals; and a plurality of second electromagnets for providing high frequency response positioning of said shaft relative to said stator in response to said second current signals.

13. The magnetic thrust bearing system of claim 12 including three of said pairs of first electromagnets and three of said pairs of second electromagnets.

14. The magnetic thrust bearing system of claim 13 wherein each of said first electromagnets is positioned between two of said second electromagnets.

15. The magnetic thrust bearing system of claim 12 wherein said control means includes correction means responsive to said sensed position for developing a position correction signal and separation means for separating said correction signal into high and low frequency components, the low frequency components being used to develop the first set of current signals and the high frequency components being used to develop the second set of current signals.

16. The magnetic thrust bearing system of claim 12 wherein each said electromagnet comprises a core having a coil wound thereon, and the core of each said first electromagnet is larger than the core of each said second electromagnet.

17. The magnetic radial bearing system of claim 15 wherein said control means further comprises transforming means for receiving said high and low frequency components of said correction signals, and for mixing said high and low frequency components of the correction signals in select proportions according to said sensed and desired axial positions of said shaft relative to said stator.

18. A magnetic bearing system for supporting a shaft comprising:

a magnetic material carried by the shaft;

a stator element positioned proximately to said magnetic material;

sensing means for sensing a sensed position of said shaft relative to said stator element; and control means operatively coupled between said sensing means and said stator for providing a set of current signals to said stator for supporting said shaft, and for maintaining a desired position of said shaft relative to said stator;

said stator element including:

a plurality of magnets for providing primary load bearing support and positioning of said shaft relative to said stator by providing a constant pulling force against a gravitational load on the shaft; and a plurality of first electromagnets for providing positioning of said shaft relative to said stator in response to said current signals.

19. The magnetic bearing system of claim 18 wherein said magnets comprise permanent magnets.

20. The magnetic bearing system of claim 18 wherein said magnets comprise a plurality of second electromagnets with each of said second electromagnets being relatively larger in size than said first electromagnets, and wherein said control means provides a constant current to said second electromagnets.

21. The magnetic bearing system of claim 18 wherein said control means includes correction means responsive to said sensed position for developing position correction signals and separation means for extracting high frequency components of said correction signals, the high frequency components being used to develop the set of current signals to said first electromagnets.

* * * * *